United States Patent [19]
Robinson

[11] Patent Number: 5,293,711
[45] Date of Patent: Mar. 15, 1994

[54] FISHING ROD COVER

[76] Inventor: David A. Robinson, 3826 Castlewood Rd., Richmond, Va. 23234

[21] Appl. No.: 939,654

[22] Filed: Sep. 3, 1992

[51] Int. Cl.⁵ .............................................. A01K 97/08
[52] U.S. Cl. .................................... 43/26; 206/315.11
[58] Field of Search ....................... 43/26; 206/315.11; 150/154

[56] References Cited

U.S. PATENT DOCUMENTS

| | | | |
|---|---|---|---|
| 679,422 | 7/1901 | Hentage | 43/26 |
| 764,398 | 7/1904 | Upton | 43/26 |
| 1,980,104 | 11/1934 | Silverspitz | 206/315.11 |
| 2,723,482 | 11/1955 | Marten | 43/26 |
| 3,033,259 | 5/1962 | Landis | 206/315.11 |
| 3,972,144 | 8/1976 | Geisler | 43/26 |
| 4,136,478 | 1/1979 | Wycosky | 43/26 |
| 4,222,193 | 9/1980 | Beck | 43/26 |
| 4,546,877 | 10/1985 | Evans | 206/315.11 |

Primary Examiner—Kurt C. Rowan
Attorney, Agent, or Firm—Leon Gilden

[57] ABSTRACT

An elongate flexible tube having an entrance opening is arranged to receive a fishing rod therewithin, with the entrance opening including a drawstring to effect securement of the fishing rod cover to the associated fishing rod. A closed second end spaced from the opened first end includes an annular array of rigid support loops rotatably mounted through the wall of the tube to support fishing components therewithin, with a pocket member mounted between the first end and second end arranged for securement of fishing accessories. Overlying flexible flaps receive and secure fishing rod hooks in a secure relationship preventing their access to individuals but convenient for use as required.

3 Claims, 4 Drawing Sheets

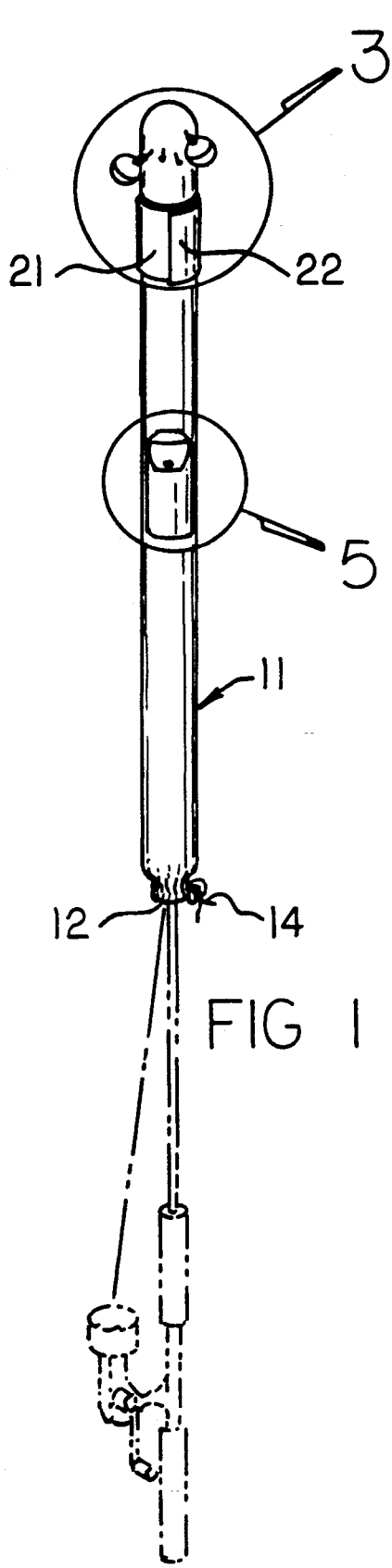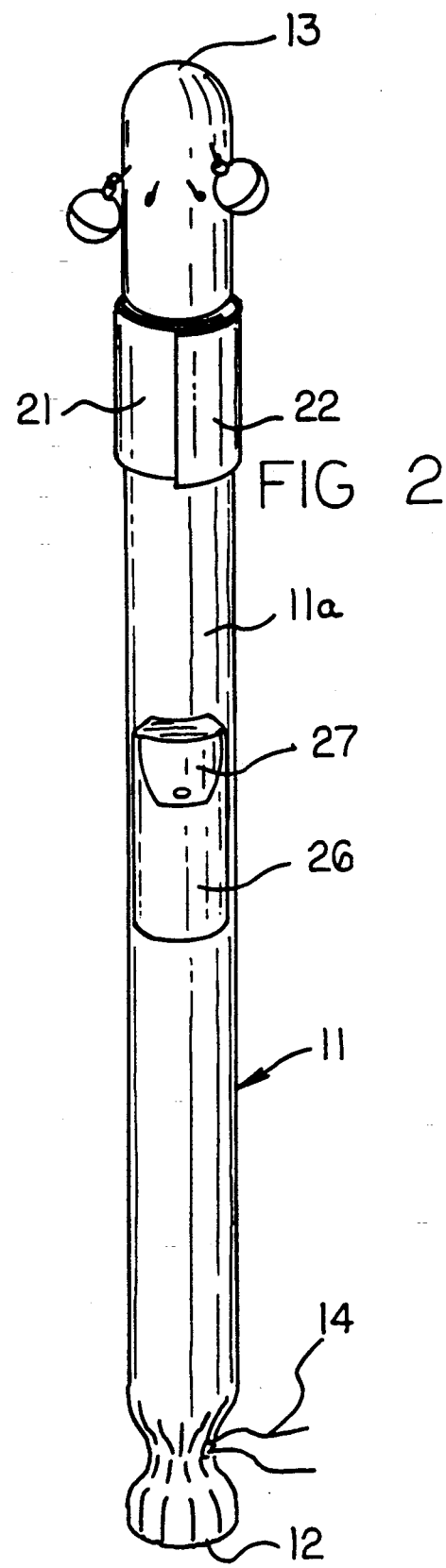

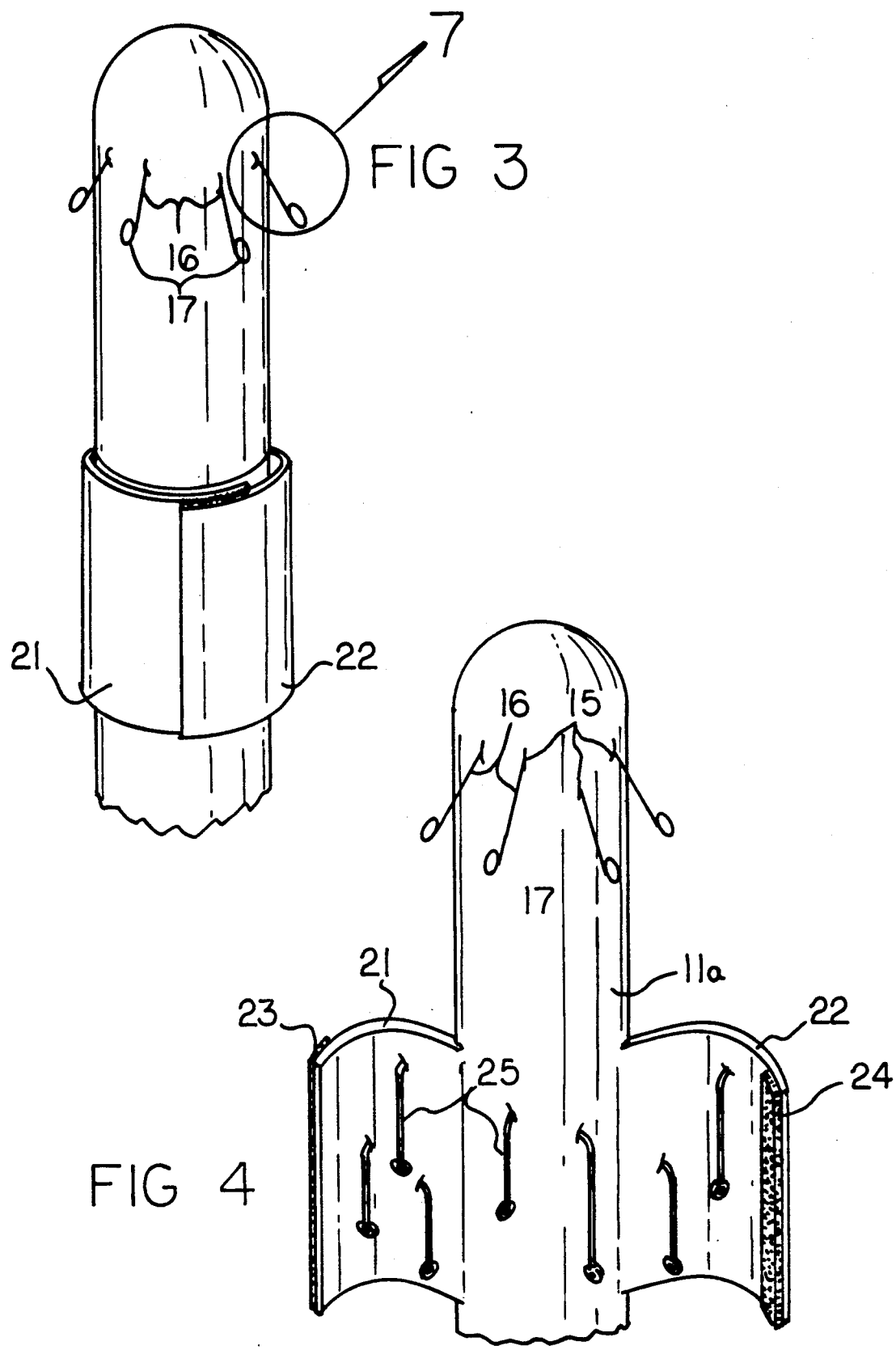

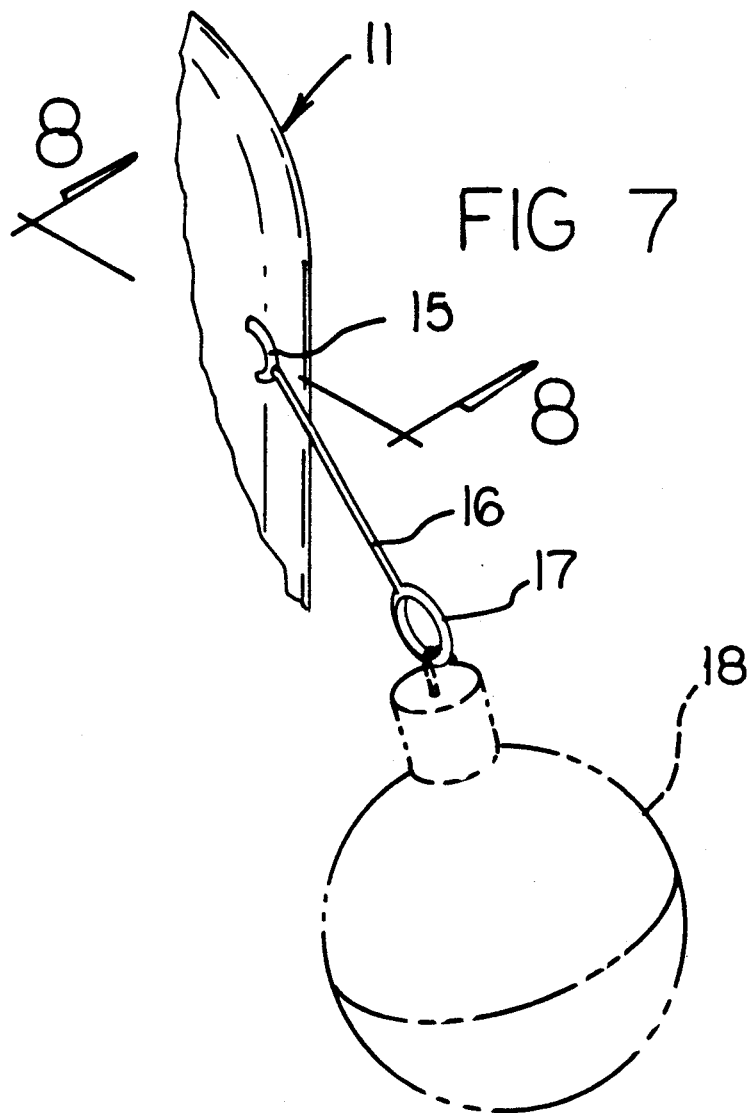
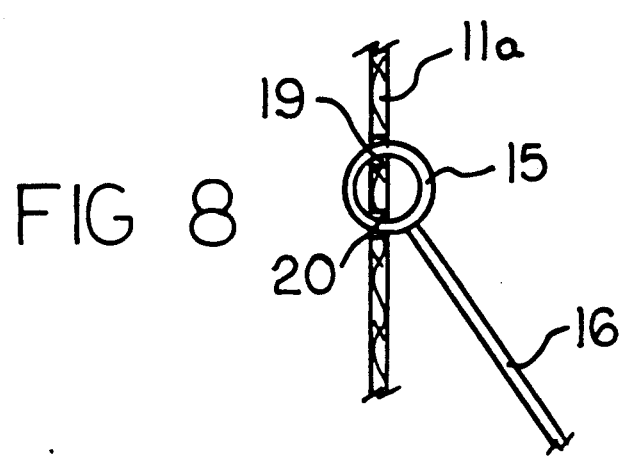

FISHING ROD COVER

BACKGROUND OF THE INVENTION

1. Field of the Invention

The field of invention relates to fishing apparatus, and more particularly pertains to a new and improved fishing rod cover wherein the same is arranged to provide for protection to the fishing rod and individuals in the transport and storage of the fishing rod structure.

2. Description of the Prior Art

During a fishing procedure, a fisherman may take an individual, or more than likely a plurality of various rod and reel combinations for use, particularly when groups of such individuals are engaged in a fishing activity. Fishing rod cover structure in the prior art has been indicated in the U.S. Pat. Nos. 4,916,852; 4,546,877; 4,171,588; and 4,858,366.

Heretofore, however, the prior art has failed to provide for a flexible covering structure as set forth by the instant invention addressing both the problems of ease of use as well as effectiveness in construction in affording protection to individuals and the fishing rod gear itself during transport and storage and in this respect, the present invention substantially fulfills this need.

SUMMARY OF THE INVENTION

In view of the foregoing disadvantages inherent in the known types of fishing apparatus now present in the prior art, the present invention provides a fishing rod cover wherein the same is arranged to afford protection to a fishing rod by providing a flexible tubular sleeve receiving the fishing rod therewithin. As such, the general purpose of the present invention, which will be described subsequently in greater detail, is to provide a new and improved fishing rod cover which has all the advantages of the prior art fishing apparatus and none of the disadvantages.

To attain this, the present invention provides an elongate flexible tube having an entrance opening arranged to receive a fishing rod therewithin, with the entrance opening including a drawstring to effect securement of the fishing rod cover to the associated fishing rod. A closed second end spaced from the opened first end includes an annular array of rigid support loops rotatably mounted through the wall of the tube to support fishing components therewithin, with a pocket member mounted between the first end and second end arranged for securement of fishing accessories. Overlying flexible flaps receive and secure fishing rod hooks in a secure relationship preventing their access to individuals but convenient for use as required.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved fishing rod cover which has all the advantages of the prior art fishing apparatus and none of the disadvantages.

It is another object of the present invention to provide a new and improved fishing rod cover which may be easily and efficiently manufactured and marketed.

It is a further object of the present invention to provide a new and improved fishing rod cover which is of a durable and reliable construction.

An even further object of the present invention is to provide a new and improved fishing rod cover which is susceptible of a low cost of manufacture with regard to both materials and labor, and which accordingly is then susceptible of low prices of sale to the consuming public, thereby making such fishing rod covers economically available to the buying public.

Still yet another object of the present invention is to provide a new and improved fishing rod cover which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the invention in use relative to a fishing rod structure.

FIG. 2 is an enlarged isometric illustration of the invention.

FIG. 3 is an isometric illustration of section 3 as set forth in FIG. 1.

FIG. 4 is an isometric illustration of the covering web structure utilized to receive fishing hooks therewithin.

FIG. 7 is an enlarged isometric illustration of section 7 as set forth in FIG. 3.

FIG. 8 is an orthographic view, taken along the lines 8—8 of FIG. 7 in the direction indicated by the arrows.

DESCRIPTION OF THE PREFERRED EMBODIMENT

Figure 5:
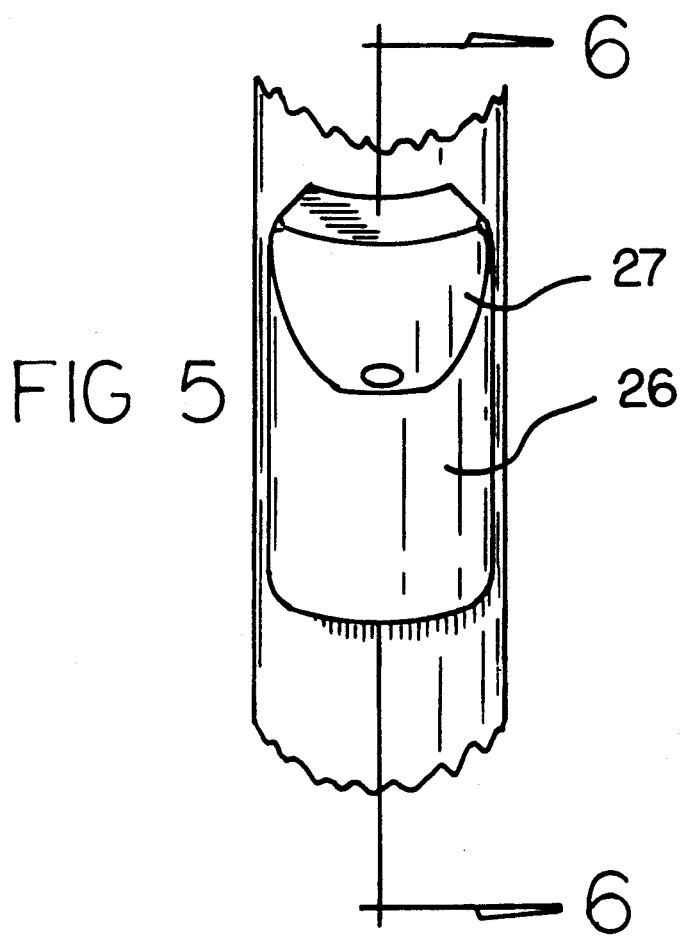
FIG. 5 is an isometric illustration of section 5 as set forth in FIG. 1.
Figure 6:
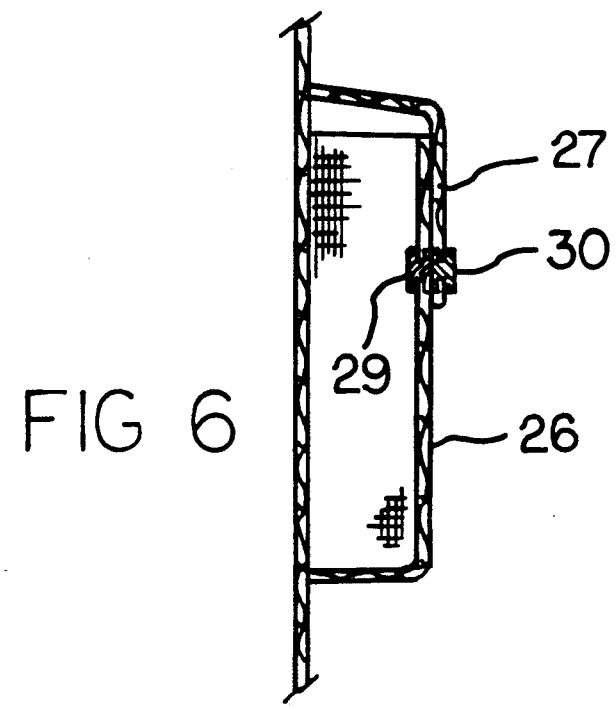
FIG. 6 is an orthographic view, taken along the lines 6—6 of FIG. 5 in the direction indicated by the arrows.

With reference now to the drawings, and in particular to FIGS. 1 to 8 thereof, a new and improved fishing rod cover embodying the principles and concepts of the present invention and generally designated by the reference numeral 10 will be described.

More specifically, the fishing rod cover 10 of the instant invention essentially comprises an elongate flexible tube 11 having an entrance opening 12 at its first end, with the first end directed into a sheath cavity to receive a fishing rod, in a manner as indicated in FIG. 1. The tube 11 includes an arcuate second end 13 to accommodate the free distal end of the fishing rod directed therewithin. To secure the fishing rod within the flexible tube 11, a drawstring 14 directed through the tube 11 in adjacency to the entrance opening 12 is provided.

An annular array of rigid support loop members 15, each of a predetermined diameter, are pivotally mounted within the tube wall 11a. To this end, a respective first and second opening 19 and 20 (see FIG. 8) is directed into the tube wall for each support loop 15, with the first and second openings 19 and 20 spaced apart said predetermined diameter. Fixedly mounted to each support loop 15 in a diametrically aligned relationship extending from the support loop is a rigid support rod 16 having a rod ring 17 at its outer end spaced from the support loop 15. The rod ring 17 of each support rod 16 is arranged to secure a fishing float 18 or other accessory of a non-barbed nature relative to the respective rod ring 17.

Respective first and second fabric flap webs 21 and 22 are mounted in a spaced parallel relationship relative to one another to the tube wall 11a. The first web 21 includes a first hook and loop fastener patch 23, with the second flap web 22 having a second hook and loop fastener patch 24 that are arranged for cooperation relative to one another. A plurality of hook members 25 are directed into the tube wall 11a between the first and second flaps 21 and 22, as well as within the first and second flaps, and the first and second flaps 21 and 22 are arranged for securement relative to one another from a first position, as illustrated in FIG. 4, to a second position, as illustrated in FIG. 3, to afford protection and avoid contact of an individual relative to the hooks 25 while permitting ease of access to the hooks in a fishing situation.

A pocket 26 is further provided below the first and second webs 21 and 22. The pocket 26 includes a cover flap 27 providing for a pocket cavity 28 to contain various components and accessories for use in fishing, such as fishing lures and the like. To assist in securement of the cover flap 27 to the pocket 26, a first magnet 29 is secured to the pocket 26, while a second magnet 30 is secured to the cover flap 27. The first and second magnets 29 and 30 have confronting opposed polarities to effect securement to one another. The use of magnets in lieu of other fasteners is utilized to minimize effort in the opening and closure of the pocket structure as to moisture in the securement of the pocket 26 with the cover flap 27.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A fishing rod cover for receiving a fishing rod therewithin, wherein the fishing rod cover comprises, a flexible tube, the flexible tube having a first end spaced from a second end, the first end having an entrance opening and an arcuate second end, wherein the flexible tube is longitudinally aligned to receive the fishing rod, and wherein securement means is mounted to the flexible tube in adjacency to the first end, and the securement means is a flexible drawstring directed through the flexible tube to permit securement of the fishing rod within the flexible tube, and including an annular array of rigid loop members pivotally mounted through the flexible tube in adjacency to the second end, wherein each loop member is of a predetermined diameter, and wherein a first opening and a second opening is directed through the tube receiving each loop member, and the first opening and the second opening are spaced apart said predetermined diameter to pivotally mount a respective loop member within a first opening and a second opening, and a rigid support rod is fixedly mounted to each loop member, and each rod includes a rod ring fixedly mounted to the rod spaced from the loop member, wherein each rod ring is arranged to secure a fishing component thereon.

2. A fishing rod cover as set forth in claim 1 including a first fabric flap web hingedly mounted to the flexible tube below the annular array of support loop members, and a second fabric flap web hingedly mounted in a spaced parallel relationship relative to the first fabric flap web below the annular array of support loop members, and the first web includes a first hook and loop fastener patch, the second flap web includes a second hook and loop fastener patch, and the first web and the second web are spaced apart a predetermined spacing, and a plurality of hook members are arranged for projection within the tube between the first web and the second web, and wherein the first web is securable to said second web in contiguous communication of the first hook and loop fastener patch and the second hook and loop fastener patch.

3. A fishing rod cover as set forth in claim 2 including a pocket mounted to the flexible tube below the first flap web and the second flap web, and the pocket includes a cover flap, and the pocket includes a first magnet member of a first polarity and the cover flap includes a second magnet member of a second polarity in confrontation to the first magnet of the first polarity to permit securement of the first magnet to the second magnet and securement of the cover flap to the pocket.

* * * * *